United States Patent
Vlasov et al.

(10) Patent No.: US 11,416,163 B2
(45) Date of Patent: Aug. 16, 2022

(54) SYSTEMS AND METHODS FOR DYNAMIC LOGICAL BLOCK ADDRESS DISTRIBUTION BETWEEN MULTICORES

(71) Applicant: SK hynix Inc., Gyeonggi-do (KR)

(72) Inventors: Teodor Vlasov, Minsk (BY); Yauheni Yaromenka, Minsk (BY)

(73) Assignee: SK hynix Inc., Gyeonggi-do (KR)

( * ) Notice: Subject to any disclaimer, the term of this patent is extended or adjusted under 35 U.S.C. 154(b) by 30 days.

(21) Appl. No.: 16/844,718

(22) Filed: Apr. 9, 2020

(65) Prior Publication Data
US 2021/0318829 A1    Oct. 14, 2021

(51) Int. Cl.
*G06F 3/06* (2006.01)
*G06F 9/50* (2006.01)

(52) U.S. Cl.
CPC .......... *G06F 3/0653* (2013.01); *G06F 3/0619* (2013.01); *G06F 3/0647* (2013.01); *G06F 3/0652* (2013.01); *G06F 3/0659* (2013.01); *G06F 3/0679* (2013.01); *G06F 9/505* (2013.01); *G06F 2209/5022* (2013.01)

(58) Field of Classification Search
CPC .... G06F 3/0653; G06F 3/0679; G06F 3/0647; G06F 3/0619; G06F 3/0652; G06F 3/0659; G06F 9/505; G06F 2209/5022; G06F 3/0616; G06F 3/064; G06F 3/0689; G06F 3/0635; G06F 3/0646; G06F 3/0688; G06F 12/0246; G06F 2212/1032; G06F 2212/1036; G06F 2212/2022; G06F 2212/222; G06F 2212/7201; G06F 13/1668; G11C 16/349; G11C 16/3495
See application file for complete search history.

(56) References Cited

U.S. PATENT DOCUMENTS

| | | | |
|---|---|---|---|
| 9,733,861 B2 * | 8/2017 | Zhang | G06F 3/0653 |
| 9,792,073 B2 | 10/2017 | Asnaashari et al. | |
| 10,218,779 B1 | 2/2019 | Cheng et al. | |

(Continued)

OTHER PUBLICATIONS

Hubbert Smith, NVMe v1.4 resolves data centre SSD noisy neighbour problems, blocksandfiles.com, Jul. 2019, https://blocksandfiles.com/2019/11/07/datacentre-ssd-noisy-neighbour-problems-and-long-tail-latencies-solved-by-nvme-v1-4/.

(Continued)

*Primary Examiner* — Reginald G Bragdon
*Assistant Examiner* — Curtis James Kortman
(74) *Attorney, Agent, or Firm* — IP & T Group LLP

(57) ABSTRACT

A data processing system includes a host, a plurality of memory devices configured to operate in parallel and a controller including a host interface controller and a plurality of cores, which are respectively coupled to the plurality of memory devices. The controller splits a logical block address (LBA) range associated with each of the cores into a plurality of LBA groups. When it is detected that there is imbalance of workloads among the cores, the controller identifies first and second cores contributing to the imbalance of workloads and selects a first LBA group, among the range of LBAs of the first core, and selecting a second LBA group, among the range of LBAs of the second core. The controller transfers data associated with the first LBA group to the second LBA group and reroutes data initially intended for the first LBA group to the second LBA group.

20 Claims, 15 Drawing Sheets

(56) References Cited

U.S. PATENT DOCUMENTS 10,902,929 B1* 1/2021 Pawlowski .......... G11C 16/349
2016/0371019 A1* 12/2016 Kang .................... G06F 3/0616

OTHER PUBLICATIONS

Saswati Das, Using NVM Sets to mitigate Read Indeterminism in SSD Drives, medium.com, Dec. 2019, https://medium.com/@saswatidas13/using-nvm-sets-to-mitigate-read-indeterminism-in-ssd-drives-4427b10bf776.

Matias Bjorling, From Open-Channel SSDs to Zoned Namespaces, usenix.org, Feb. 2019, https://www.usenix.org/conference/vault19/presentation/bjorling.

* cited by examiner

SYSTEMS AND METHODS FOR DYNAMIC LOGICAL BLOCK ADDRESS DISTRIBUTION BETWEEN MULTICORES

BACKGROUND

1. Field

Embodiments of the present disclosure relate to a scheme for distributing logical block addresses between multicores.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Memory systems using memory devices provide excellent stability, durability, high information access speed, and low power consumption, since they have no moving parts. Examples of memory systems having such advantages include universal serial bus (USB) memory devices, memory cards having various interfaces such as a universal flash storage (UFS), and solid state drives (SSDs). Memory systems such as NAND flash based memory systems may include a memory controller and NAND flash memory devices. The memory controller may be implemented with multicores to address the growing needs of cloud applications and big data demands.

SUMMARY

Aspects of the present invention include systems and methods for dynamically distributing logical block addresses (LBAs) between multicores.

In one aspect, a data processing system includes a host, a plurality of memory devices configured to operate in parallel and a controller including a host interface controller and a plurality of cores, which are respectively coupled to the plurality of memory devices. The controller splits a logical block address (LBA) range associated with each of the cores into a plurality of LBA groups. The controller detects whether there is imbalance of workloads among the cores. When it is detected that there is imbalance of workloads among the cores, the controller identifies first and second cores contributing to the imbalance of workloads and selecting a first LBA group, among the range of LBAs of the first core, and selects a second LBA group, among the range of LBAs of the second core. The controller transfers data associated with the first LBA group to the second LBA group and reroutes data initially intended for the first LBA group to the second LBA group.

In another aspect, a method operates a data processing system, which includes a host, a plurality of memory devices configured to operate in parallel and a controller including a host interface controller and a plurality of cores, which are respectively coupled to the plurality of memory devices. The method includes: splitting a logical block address (LBA) range associated with each of the cores into a plurality of LBA groups; detecting whether there is imbalance of workloads among the cores; when it is detected that there is imbalance of workloads among the cores, identifying first and second cores contributing to the imbalance of workloads and selecting a first LBA group, among the range of LBAs of the first core, and selecting a second LBA group, among the range of LBAs of the second core; transferring data associated with the first LBA group to the second LBA group; and rerouting data initially intended for the first LBA group to the second LBA group.

Additional aspects of the present invention will become apparent from the following description.

DETAILED DESCRIPTION

Figure 1:
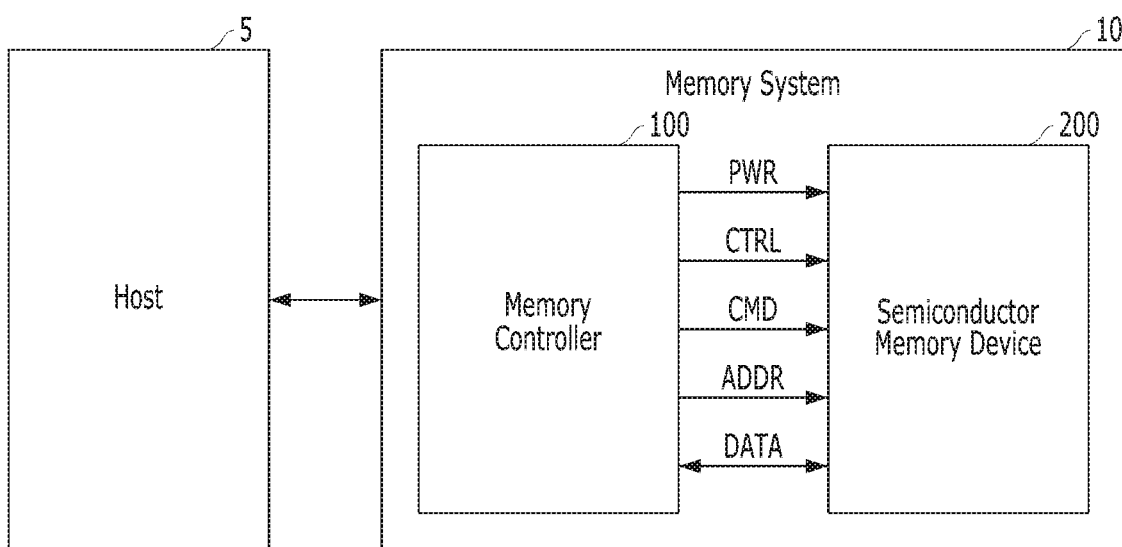
FIG. 1 is a block diagram illustrating a data processing system in accordance with an embodiment of the present invention.

Various embodiments are described below in more detail with reference to the accompanying drawings. The present invention may, however, be embodied in different forms and thus should not be construed as limited to the embodiments set forth herein. Rather, these embodiments are provided so that this disclosure is thorough and complete and fully conveys the scope of the present invention to those skilled in the art. Moreover, reference herein to "an embodiment," "another embodiment," or the like is not necessarily to only one embodiment, and different references to any such phrase are not necessarily to the same embodiment(s). Throughout the disclosure, like reference numerals refer to like parts in the figures and embodiments of the present invention.

The invention can be implemented in numerous ways, including as a process; an apparatus; a system; a computer program product embodied on a computer-readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The scope of the invention is limited only by the claims. The invention encompasses numerous alternatives, modifications and equivalents within the scope of the claims. Numerous specific details are set forth in the following description in order to provide a thorough understanding of the invention. These details are provided for the purpose of example; the invention may be practiced according to the claims without some or all of these specific details. For clarity, technical material that is known in technical fields related to the invention has not been described in detail so that the invention is not unnecessarily obscured.

FIG. 1 is a block diagram illustrating a data processing system 2 in accordance with an embodiment of the present invention.

Referring FIG. 1, the data processing system 2 may include a host device 5 and a memory system 10. The memory system 10 may receive a request from the host device 5 and operate in response to the received request. For example, the memory system 10 may store data to be accessed by the host device 5.

The host device 5 may be implemented with any one of various kinds of electronic devices. In various embodiments, the host device 5 may include an electronic device such as a desktop computer, a workstation, a three-dimensional (3D) television, a smart television, a digital audio recorder, a digital audio player, a digital picture recorder, a digital picture player, and/or a digital video recorder and a digital video player. In various embodiments, the host device 5 may include a portable electronic device such as a mobile phone, a smart phone, an e-book, an MP3 player, a portable multimedia player (PMP), and/or a portable game player.

The memory system 10 may be implemented with any one of various kinds of storage devices such as a solid state drive (SSD) and a memory card. In various embodiments, the memory system 10 may be provided as one of various components in an electronic device such as a computer, an ultra-mobile personal computer (PC) (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

The memory system 10 may include a memory controller 100 and a semiconductor memory device 200. The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output lines. The semiconductor memory device 200 may receive power PWR through a power line and a control signal CTRL through a control line. The control signal CTRL may include a command latch enable signal, an address latch enable signal, a chip enable signal, a write enable signal, a read enable signal, as well as other operational signals depending on design and configuration of the memory system 10.

The memory controller 100 and the semiconductor memory device 200 may be integrated in a single semiconductor device such as a solid state drive (SSD). The SSD may include a storage device for storing data therein. When the semiconductor memory system 10 is used in an SSD, operation speed of a host device (e.g., host device 5 of FIG. 1) coupled to the memory system 10 may remarkably improve.

The memory controller 100 and the semiconductor memory device 200 may be integrated in a single semiconductor device such as a memory card. For example, the memory controller 100 and the semiconductor memory device 200 may be so integrated to configure a personal computer (PC) card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and/or a universal flash storage (UFS).

Figure 2:
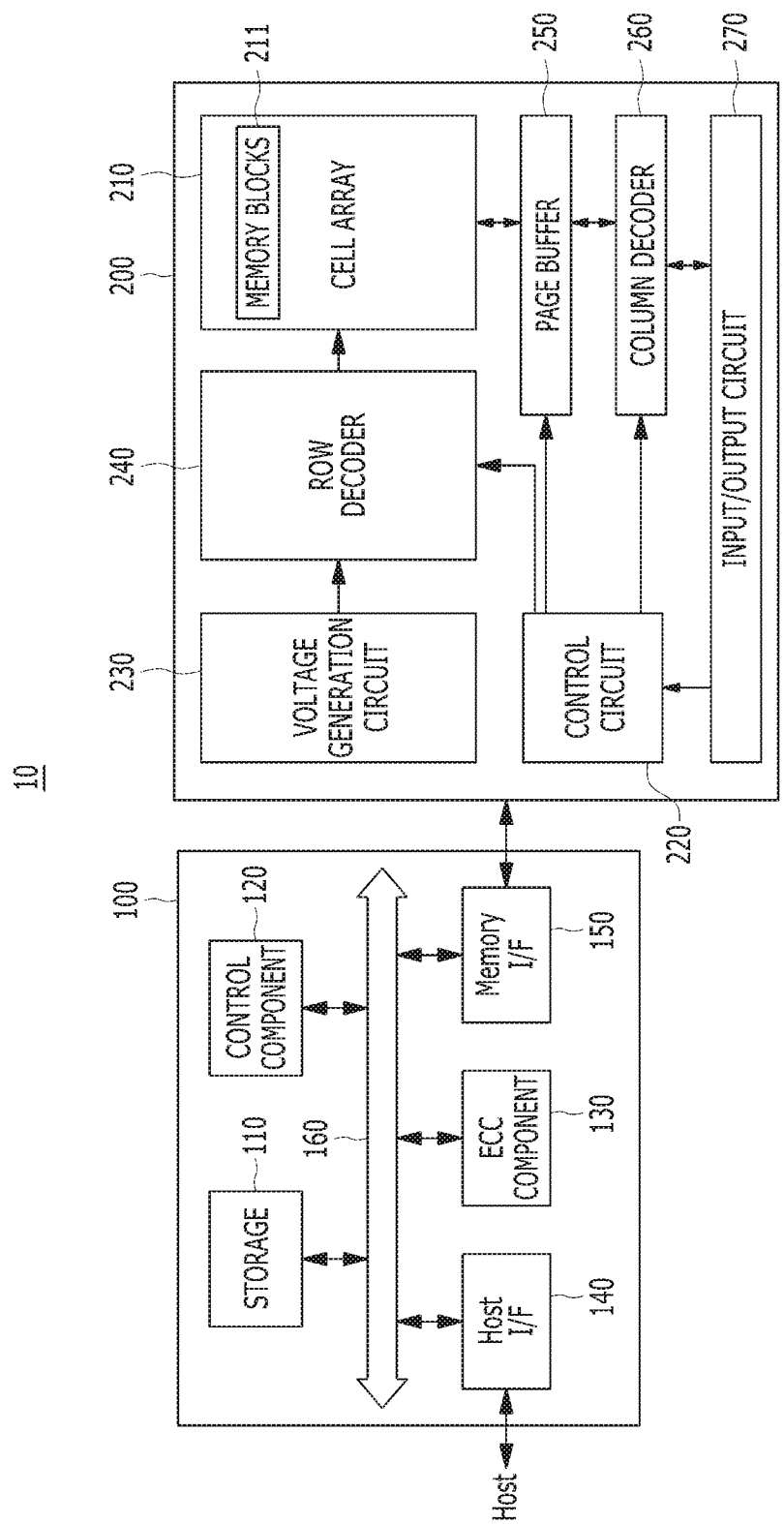
FIG. 2 is a block diagram illustrating a memory system in accordance with an embodiment of the present invention.

FIG. 2 is a block diagram illustrating a memory system in accordance with an embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device (e.g., host device 5 of FIG. 1), and in particular, store data to be accessed by the host device.

The memory device 200 may store data to be accessed by the host device.

The memory device 200 may be implemented with a volatile memory device such as a dynamic random access memory (DRAM) and/or a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120, which may be implemented as a processor such as a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented with a volatile memory such as a static random access memory (SRAM) or a dynamic random access memory (DRAM). As described above, the storage 110 may store data used by the host device in the memory device 200 for the read and write operations. To store the data, the storage 110 may include a program memory, a data memory, a e buffer, a read buffer, a map buffer, and the like.

The control component 120 may control general operations of the memory system 10, and a write operation or a read operation for the memory device 200, in response to a write request or a read request from the host device. The control component 120 may drive firmware, which is referred to as a flash translation layer (FTL), to control general operations of the memory system 10. For example, the FTL may perform operations such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure in correcting the error bits.

In various embodiments, the ECC component 130 may perform an error correction operation based on a coded modulation such as a low density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a Block coded modulation (BCM). However, error correction is not limited to these techniques. As such, the ECC component 130 may include any and all circuits, systems or devices for suitable error correction operation.

The host interface 140 may communicate with the host device through one or more of various interface protocols such as a universal serial bus (USB), a multi-media card (MMC), a peripheral component interconnect express (PCI-e or PCIe), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the control component 120. When the memory device 200 is a flash memory such as a NAND flash memory, the memory interface 150 may generate control signals for the memory and process data under the control of the control component 120.

The memory device 200 may include a memory cell array 210, a control circuit 220, a voltage generation circuit 230, a row decoder 240, a page buffer 250, which may be in the form of an array of page buffers, a column decoder 260, and an input and output (input/output) circuit 270. The memory cell array 210 may include a plurality of memory blocks 211 which may store data. The voltage generation circuit 230, the row decoder 240, the page buffer array 250, the column decoder 260 and the input/output circuit 270 may form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address generated by the control circuit 220, and transmit operation voltages supplied from the voltage generation circuit 230 to the selected memory blocks.

Figure 3:
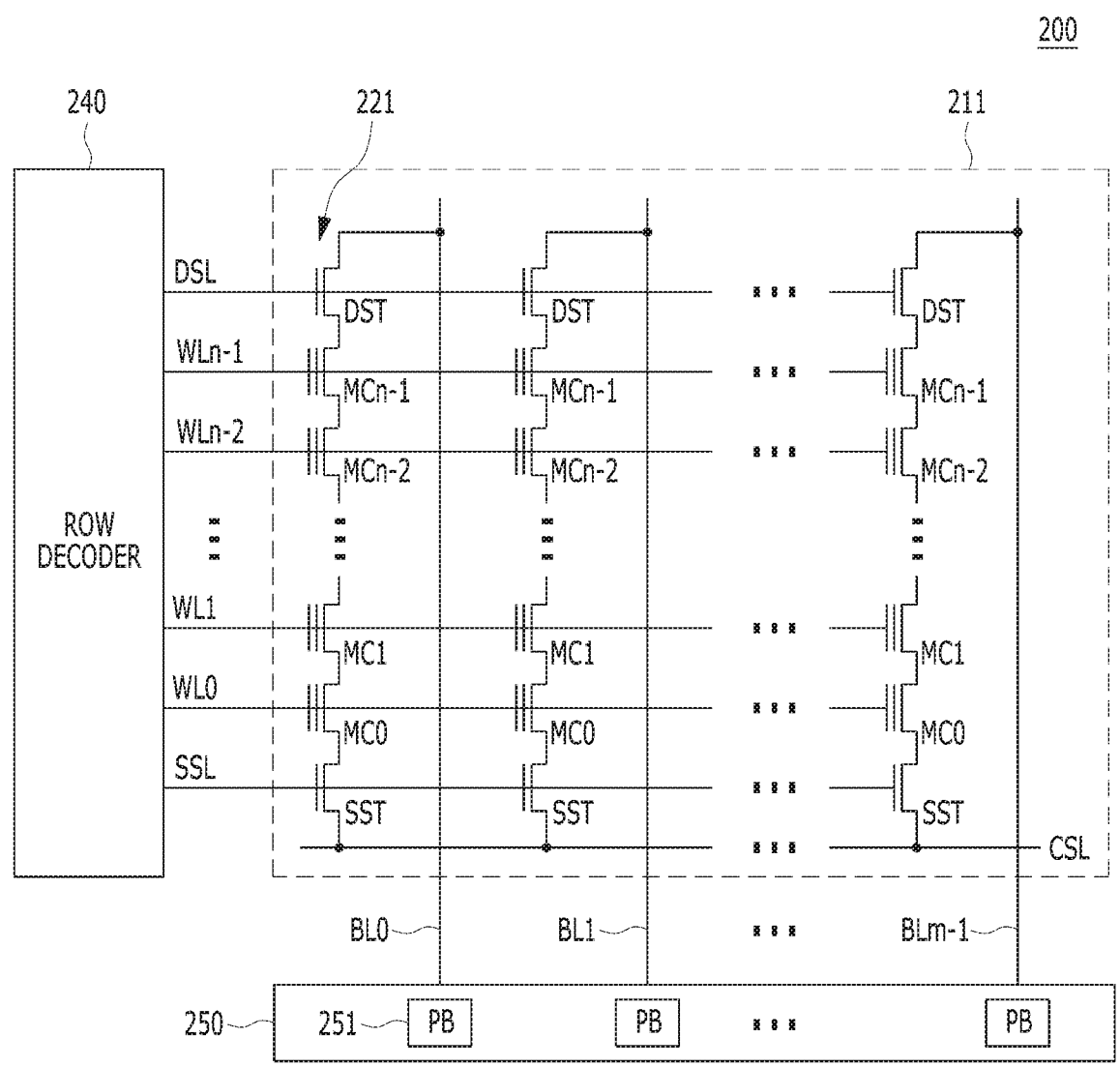
FIG. 3 is a circuit diagram illustrating a memory block of a memory device in accordance with an embodiment of the present invention.

The page buffer 250 may be coupled with the memory cell array 210 through bit lines BL (shown in FIG. 3). The page buffer 250 may precharge the bit lines BL with a positive voltage, transmit data to, and receive data from, a selected memory block in program and read operations, or temporarily store transmitted data, in response to page buffer control signal(s) generated by the control circuit 220.

The column decoder 260 may transmit data to, and receive data from, the page buffer 250 or transmit and receive data to and from the input/output circuit 270.

The input/output circuit 270 may transmit to the control circuit 220 a command and an address, received from an external device (e.g., the memory controller 100 of FIG. 1), transmit data from the external device to the column decoder 260, or output data from the column decoder 260 to the external device, through the input/output circuit 270.

The control circuit 220 may control the peripheral circuit in response to the command and the address.

FIG. 3 is a circuit diagram illustrating a memory block of a semiconductor memory device in accordance with an embodiment of the present invention. For example, the memory block of FIG. 3 may be any of the memory blocks 211 of the memory cell array 210 shown in FIG. 2.

Referring to FIG. 3, the exemplary memory block 211 may include a plurality of word lines WL0 to WLn−1, a drain select line DSL and a source select line SSL coupled to the row decoder 240. These lines may be arranged in parallel, with the plurality of word lines between the DSL and SSL.

The exemplary memory block 211 may further include a plurality of cell strings 221 respectively coupled to bit lines BL0 to BLm−1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn−1 may be serially coupled between the selection transistors DST and SST. Each of the memory cells may be formed as a multiple level cell. For example, each of the memory cells may be formed as a single level cell (SLC) storing 1 bit of data. Each of the memory cells may be formed as a multi-level cell (MLC) storing 2 bits of data. Each of the memory cells may be formed as a triple-level cell (TLC) storing 3 bits of data. Each of the memory cells may be formed as a quadruple-level cell (QLC) storing 4 bits of data.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

The page buffer array 250 may include a plurality of page buffers 251 that are coupled to the bit lines BL0 to BLm−1. The page buffers 251 may operate in response to page buffer control signals. For example, the page buffers 251 may temporarily store data received through the bit lines BL0 to BLm−1 or sense voltages or currents of the bit lines during a read or verify operation.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

Figure 4:
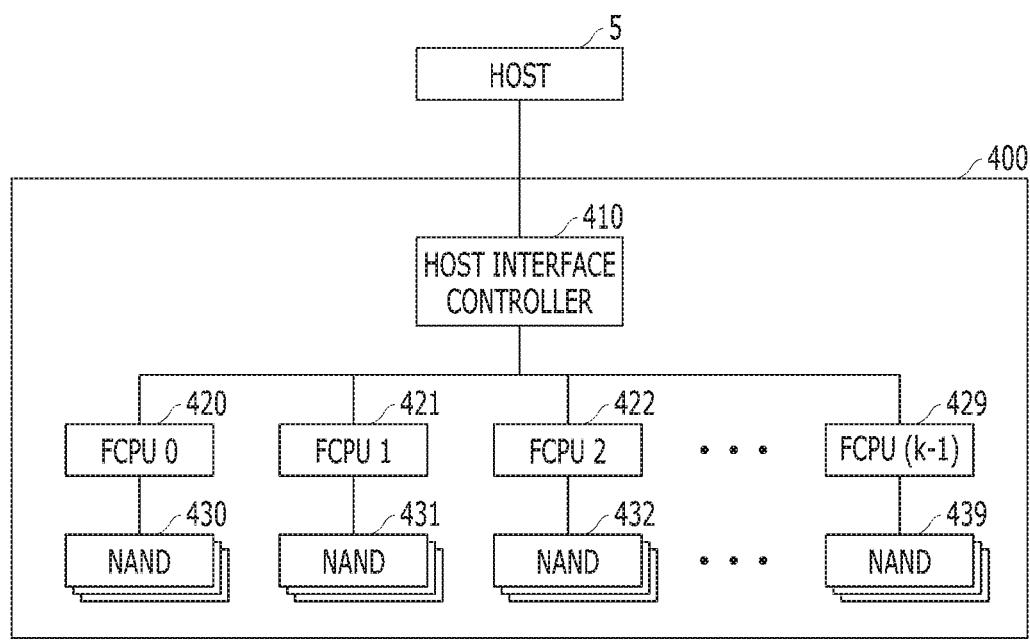
FIG. 4 is a diagram illustrating a data processing system, which includes a memory system including multicores in accordance with an embodiment of the present invention.

FIG. 4 is a diagram illustrating a data processing system, which includes a memory system 400 including multicores in accordance with an embodiment of the present invention.

Referring to FIG. 4, the data processing system may include a host 5 and the memory system 400. The memory system 400 may be implemented with multicores to address the growing needs of cloud applications and big data demands. In other words, the memory system 400 may include a host interface controller (or a core in a host interface layer (HIL core)) 410 and a plurality of cores 420 to 429. Each of the plurality of cores may be implemented with a central processing unit (CPU) in a flash translation layer (FCPU). A plurality of memory devices in parallel may be respectively coupled to the plurality of cores 420 to 429. For example, multiple NAND regions (e.g., dies or blocks) 430 to 439 are respectively coupled to the plurality of cores 420 to 429. Although not shown in FIG. 4, the controller 100 and the memory device 200 may include various other components of the memory system 10 as shown in FIG. 2.

Figure 5:
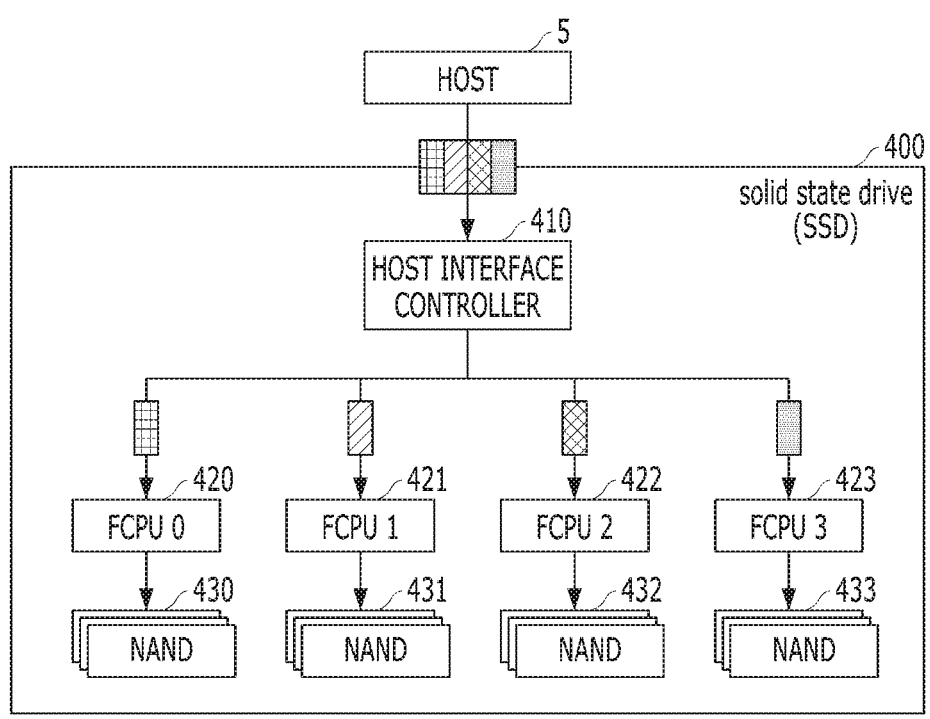
FIG. 5 illustrates an example of static logical block address (LBA) distribution between cores in FIG. 4.

FIG. 5 illustrates an example of a static logical block address (LBA) distribution between cores of the memory system 400 in FIG. 4.

Referring to FIG. 5, the memory system 400 may be implemented with a solid state drive (SSD), which includes a plurality of cores 420 to 423 respectively coupled to NAND memory dies 430 to 433. Each of the cores 420 to 423 receives commands from the host 5 and processes commands independently. To facilitate parallelism of operations in the SSD, LBAs may be statically routed to different cores. Each core has its own data structures and LBA ranges. In accordance with this kind of static LBA distribution, all cores are independent of each other as shown in FIG. 5. Thus, removing or adding one or more cores is transparent to the other cores and any sequential reads/writes are perfectly paralleled. However, there may exist a situation in which workload would trigger one core more frequently than the others, which creates premature wear-out of the SSD. This situation may lead to a significant performance degradation of the SSD. Therefore, it is desirable to provide a dynamic LBA distribution scheme capable of balancing workloads between multiple cores in the memory system.

Figure 6:
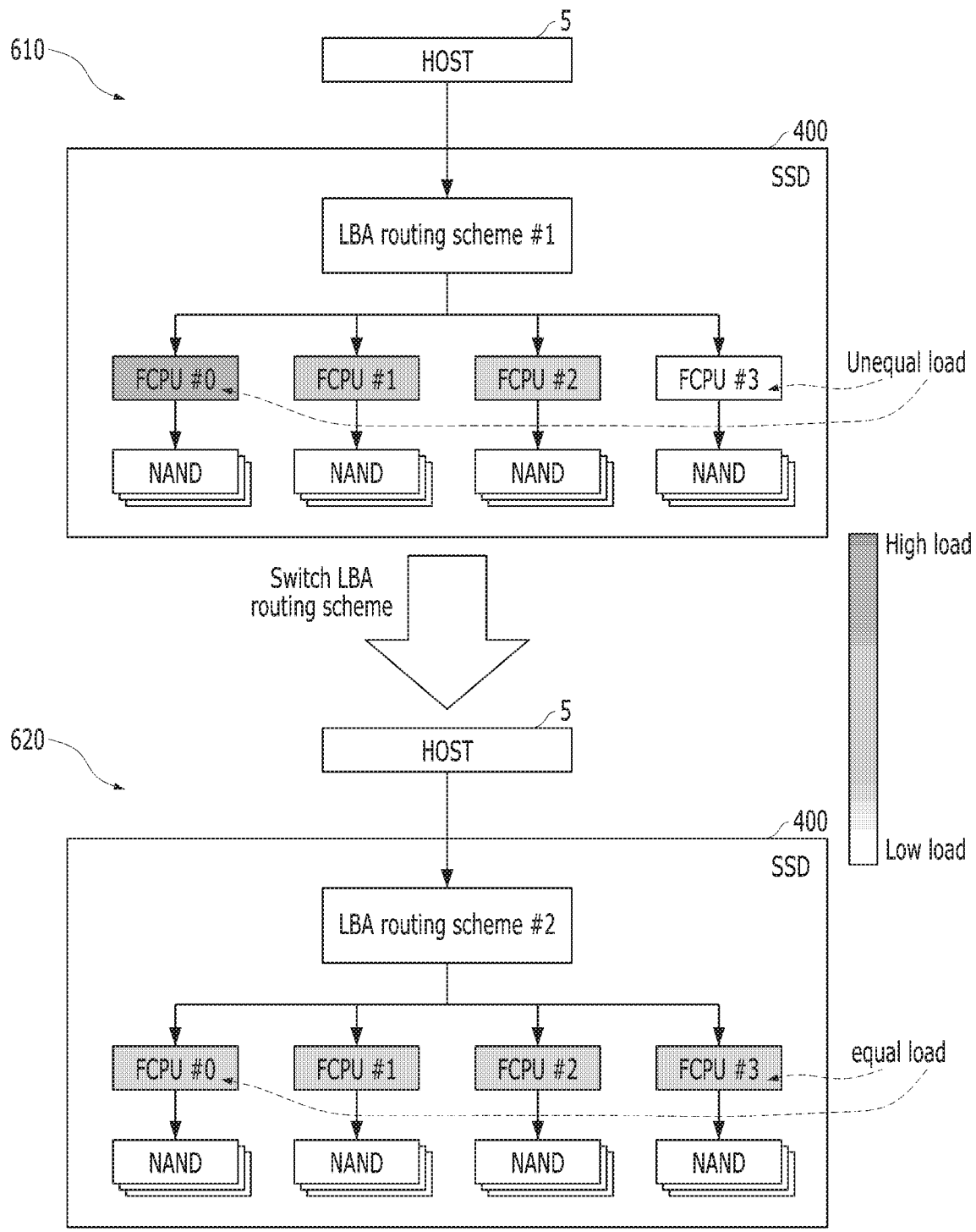
FIG. 6 illustrates switching an LBA routing scheme in a memory system in accordance with an embodiment of the present invention.

FIG. 6 illustrates switching an LBA routing (or mapping) scheme in the memory system 400 in accordance with an embodiment of the present invention.

Referring to FIG. 6, the memory system 400 receives LBAs associated with workloads (e.g., write, read or erase operations) from the host 5 and distributes the received LBAs into one or more cores FCPU #0 to FCPU #3 using a first LBA routing scheme (#1). When workloads trigger one core, e.g., FCPU #0, more frequently than the others FCPU #1 to FCPU #3, or trigger the cores at uneven rates, a workload imbalance occurs. For example, workloads of the cores FCPU #0 to FCPU #3 become unequal or non-uniform, e.g., FCPU #0>FCPU #1>FCPU #2>FCPU #3. In order to resolve this imbalance, the memory system 400 may switch from the first LBA routing scheme (#1) to a second LBA routing scheme (#2) such that workloads of the cores FCPU #0 to FCPU #3 become equal or at least more balanced; ideally: FCPU #0=FCPU #1=FCPU #2=FCPU #3.

The present inventors observed that changing the LBA mapping for every single LBA tends to impose high memory overhead, especially for an SSD that has a large LBA range. Also, the present inventors observed that the non-uniform workload may be localized in a certain narrow LBA range. Thus, embodiments split LBA ranges of every core into groups as shown in FIG. 7 such that an LBA routing scheme is switched only for a small range of LBAs, i.e., a group of LBAs.

Figure 7:
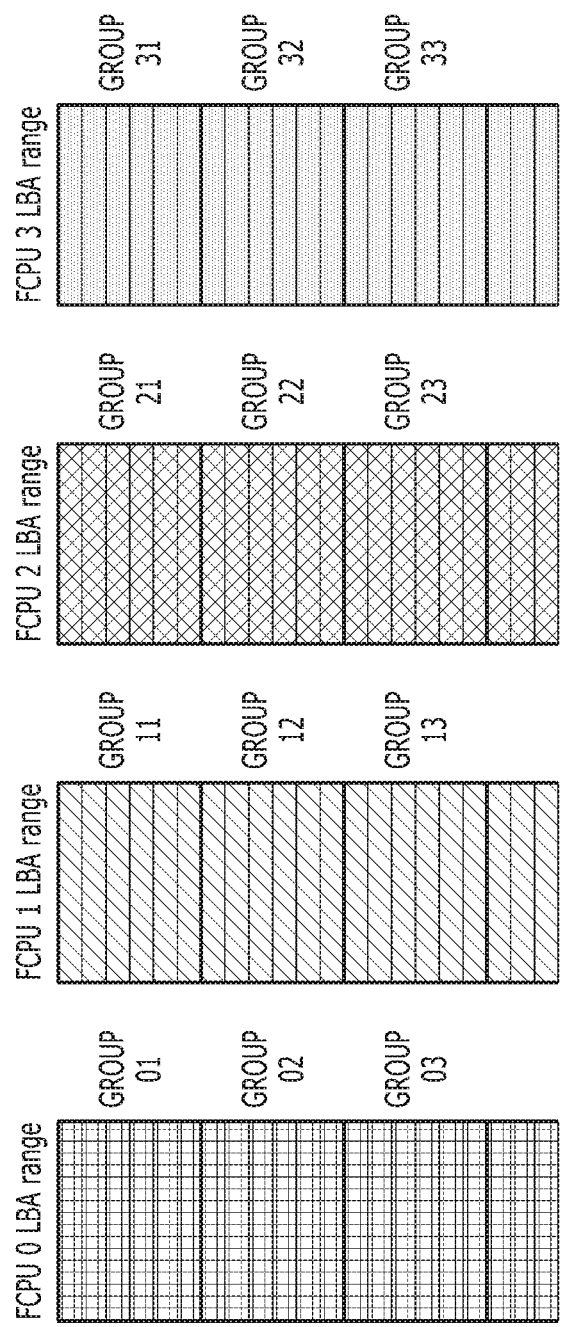
FIG. 7 illustrates splitting LBA ranges of every core into groups in accordance with an embodiment of the present invention.

In the illustration of FIG. 7, each of the cores FCPU0 to FCPU3 has a full LBA range that may be split into a set of ranges, i.e., a plurality of groups. The range of LBAs for every core may be non-continuous as well as continuous. An LBA range of the first core FCPU0 is split into a plurality of groups, e.g., 3 groups GROUP01 to GROUP03. An LBA range of the second core FCPU1 is split into a plurality of groups, e.g., 3 groups GROUP11 to GROUP13. An LBA range of the third core FCPU2 is split into a plurality of groups, e.g., 3 groups GROUP21 to GROUP23. An LBA range of the fourth core FCPU3 is split into a plurality of groups, e.g., 3 groups GROUP31 to GROUP33. The sizes of each of the above-identified groups may be equal. In addition to the three groups noted above, each of the cores may also include a last group of LBAs, which is not the same size as the other groups in that core. The last group in each core may be smaller than each of the other groups in that core.

Embodiments may define an LBA routing (or mapping) scheme for each group, which maps between LBAs and identifiers (IDs) of cores. Each time the LBA routing scheme is switched for a particular group, all data associated with it is transferred to a new location. Therefore, the size of LBA groups directly affects the time required for completing the switch from one LBA routing scheme to another. The more LBAs there are in a group, the less memory is required to store LBA mapping. However, the time to switch the LBA routing scheme increases as the number of LBAs in a group increases. Accordingly, the size of a group, i.e, the number of LBAs in a group, may be determined based on the size of memory and/or the switch time of LBA routing scheme, and preferably on both of these competing considerations.

Figure 8:
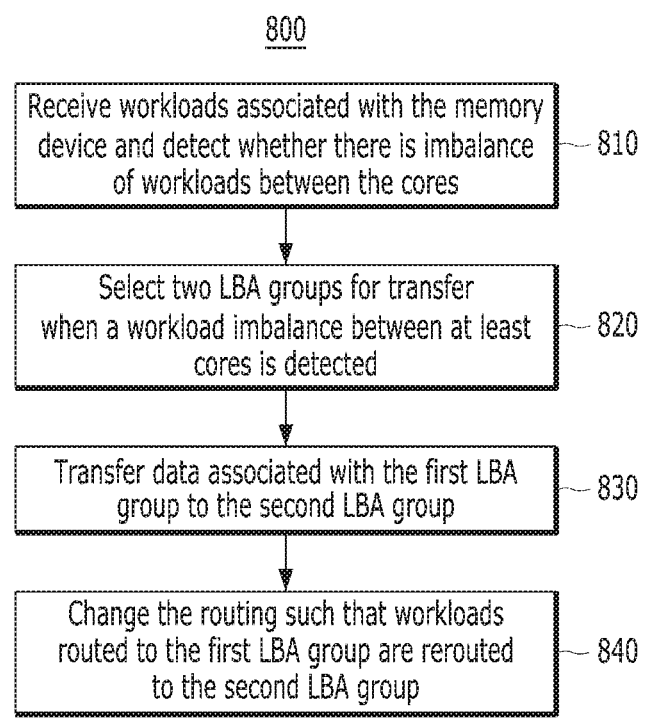
FIG. 8 is a flowchart illustrating an LBA distribution operation in accordance with an embodiment of the present invention.

FIG. 8 is a flowchart illustrating an LBA distribution operation 800 in accordance with an embodiment of the present invention. The LBA distribution operation 800 may be performed by the host interface controller 410 of the memory system 400 in FIG. 4. Before performing the LBA distribution operation 800, the host interface controller 410 LBA splits an LBA range for each core into a plurality of groups, as shown in FIG. 7. Collectively, the plurality of groups comprise a total number of LBA groups.

Referring to FIG. 8, at step 810, the host interface controller 410 may receive, from the host, workloads associated with the memory device and detect whether there is imbalance of workloads between the cores. Some workloads may trigger some cores in the memory system more than others and thus lead to a workload imbalance. This is caused by the fact that the majority of operations corresponding to the workloads are routed to the same core(s). In this case, the performance of the memory system may be improved by changing the routing scheme, that is, how work is routed to at least the cores contributing to the imbalance.

At step 820, when a workload imbalance between at least two cores is detected, the host interface controller 410 may select two LBA groups for transfer. In other words, the host interface controller 410 may select first and second LBA groups of two different cores associated with the imbalance, among all LBA groups.

As such, once the workload imbalance is detected, LBA groups are selected for transfer between cores. Each group may be characterized by its write intensity, which describes how frequently LBAs from that group are written. The groups for transfer may be chosen in a way that would allow balancing load on different cores: a group with write intensity above average is chosen from the LBA groups of a hot core and a group with intensity below average is chosen from the LBA groups of a cold core.

In some embodiments, the host interface controller 410 may detect whether there is the imbalance of workloads between the cores, by monitoring write intensity for each of the LBA groups across all cores in a set period.

In another embodiment, the host interface controller 410 may monitor erase count for each of the LBA groups, and may detect whether there is the imbalance of workloads between the cores, based on the monitored erase counts. In this embodiment, the first LBA group has the largest difference between a maximal erase count of an LBA therein and an average erase count of that LBA group, and the second LBA group has the smallest difference between a maximal erase count of an LBA therein and an average erase count of that LBA group.

In another embodiment, the host interface controller 410 may monitor the number of writes for each of the total LBA groups, and detect whether there is the imbalance of workloads between the cores, based on the monitored number of writes. In this embodiment, the first LBA group has the number of writes with the largest difference from an average number of writes of all LBA groups, and the second LBA group has the number of writes with the smallest difference from the average number of writes of all LBA groups.

At step 830, the host interface controller 410 may transfer data associated with the first LBA group to the second LBA group. At step 840, the host interface controller 410 may change the routing such that workloads routed to the first LBA group are rerouted to the second LBA group.

Figure 9A:
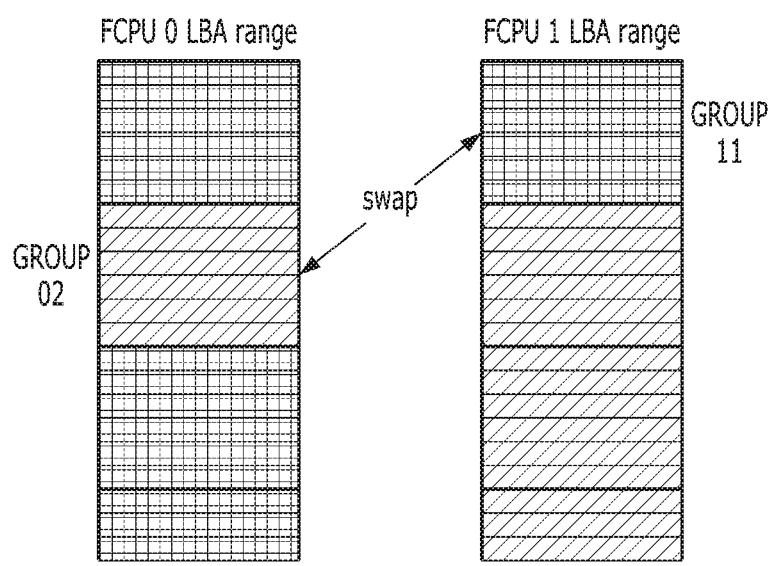
FIGS. 9A and 9B illustrate transfer operations of LBA groups for workload balancing in accordance with an embodiment of the present invention.
Figure 9B:
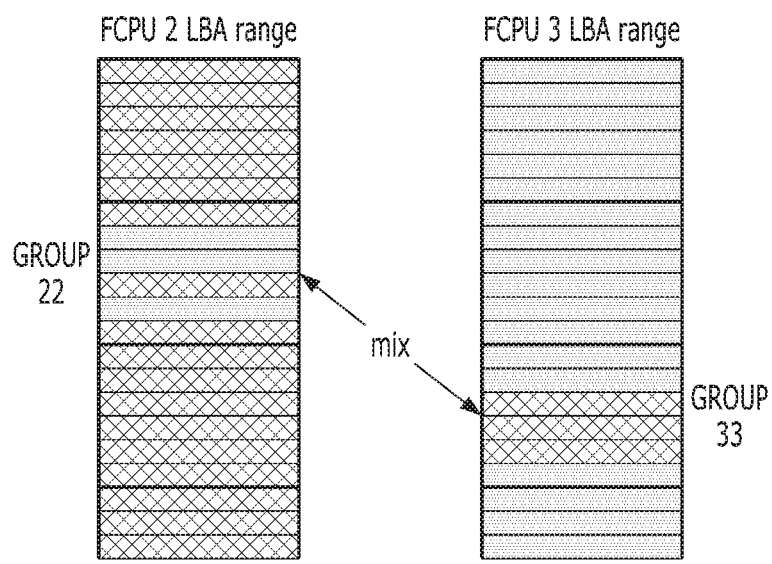

FIGS. 9A and 9B illustrate transfer operations of LBA groups for workload balancing in accordance with an embodiment of the present invention. FIG. 9A illustrates a swap operation, and FIG. 9B illustrates a mix operation. In the swap operation of FIG. 9A, all LBAs of group 02 of the core FCPU0 are transferred to group 11 of the core FCPU1, and vice versa. In this example, orders of LBAs in each group are not changed. In the mix operation of FIG. 93, only some LBAs are transferred between group 22 of the core FCPU2 and group 33 of the core FCPU3. In this illustration example, orders of LBAs in each group are changed. The mix operation may be superior to the swap operation, since only the hottest and coldest LBAs from groups may be transferred, thus reducing transfer time and increasing its efficiency. However, the mix operation may have larger memory requirements to store group mapping, compared to the swap operation.

Figure 10:
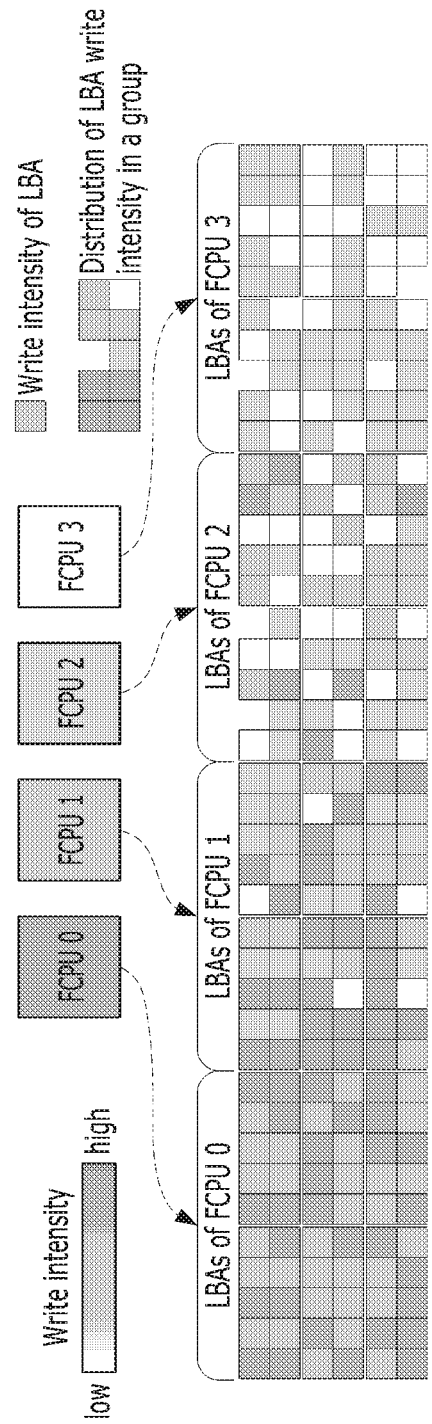
FIG. 10 illustrates imbalanced wear between cores in a memory system.

FIG. 10 illustrates imbalanced wear among cores in a memory system. The workload on the memory system causes imbalanced load on cores, which is reflected in the write intensities for the LBAs.

Referring to FIG. 10, an example of imbalance between cores FCPU0 to FCPU3 is illustrated. In the illustrated example, an LBA range of each core includes 6 groups of LBAs and each group includes 10 LBAs. Imbalanced wearout between cores FCPU0 to FCPU3 may be caused by unequal write intensity for LBAs stored in the corresponding NAND memory dies. Write intensity of an LBA is designated as a grade of color. The average of write intensity of LBAs in a group defines the write intensity of a group, while average of write intensities of groups in a core defines the write intensity of the core. In the illustrated example, write intensity of FCPU0 is the highest, write intensity of FCPU1 is lower than the write intensity of FCPU0, write intensity of FCPU2 is lower than the write intensity of FCPU1 and write intensity of FCPU3 is the lowest write intensity.

Imbalance may be detected using a method of continuously monitoring maximal erase count difference in the memory system or the difference between maximal and average erase count, as previously explained. Another method is monitoring the number of writes that are routed to each core until the number of writes is approximately equal to the actual number of erases for that core.

Selection of LBA groups for transfer may be implemented by selecting groups with the largest difference in write intensity among the cores. This approach allows compensating imbalance in the fastest manner. It is important to compensate imbalance as soon as it is detected. Otherwise, information about write intensity of groups may get outdated, because of workload change. Transfer operations for two selected LBA groups may be performed as shown in FIGS. 11 and 12.

Figure 11:
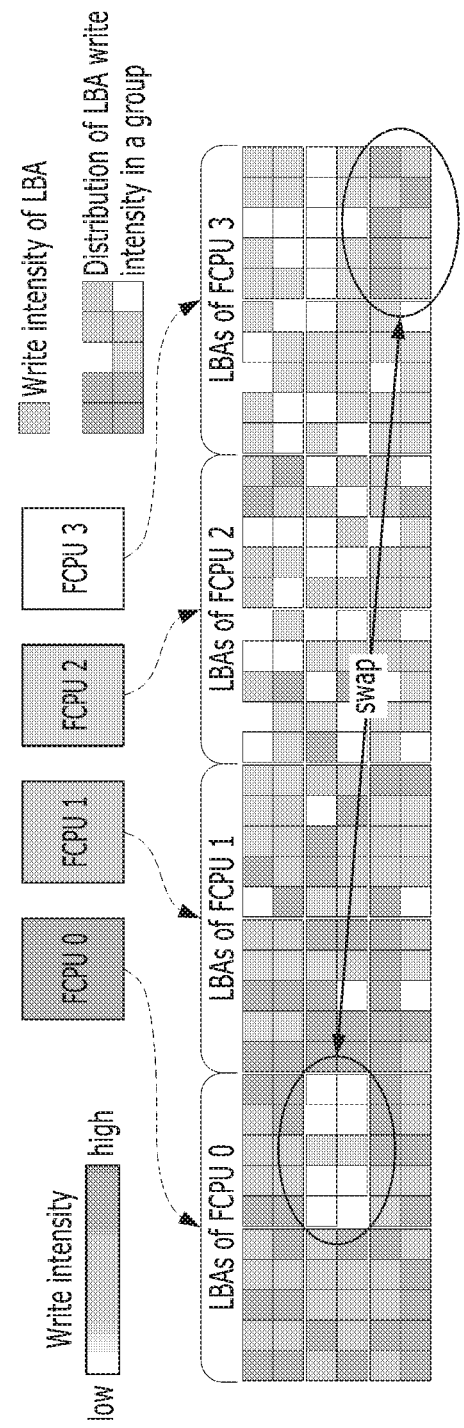
FIG. 11 illustrates an example of a swap operation for selected LBA groups in accordance with an embodiment of the present invention.

FIG. 11 illustrates an example of a swap operation for selected LBA groups in accordance with an embodiment of the present invention.

Referring to FIG. 11, the swap operation is performed between an LBA group GROUP04 of FCPU0 and an LBA group GROUP36 of FCPU3. In this case, LBAs that were previously assigned to FCPU3 may be renamed through a routing scheme and routed to FCPU0, and LBAs from FCPU0 would be routed to FCPU3. In doing so, their relative positions may be preserved. However, it may turn out that data for groups that are switched are already present in NAND regions (e.g, dies) associated with corresponding cores. Then, these data are read from corresponding NAND regions and transferred to another core, so that it could be written to a new location. The transfer of already present data of LBA groups which a routing scheme is switched is performed simultaneously for two or more cores. If enough groups are transferred and workload is persistent enough, write intensity of the FCPUs becomes more balanced.

Figure 12:
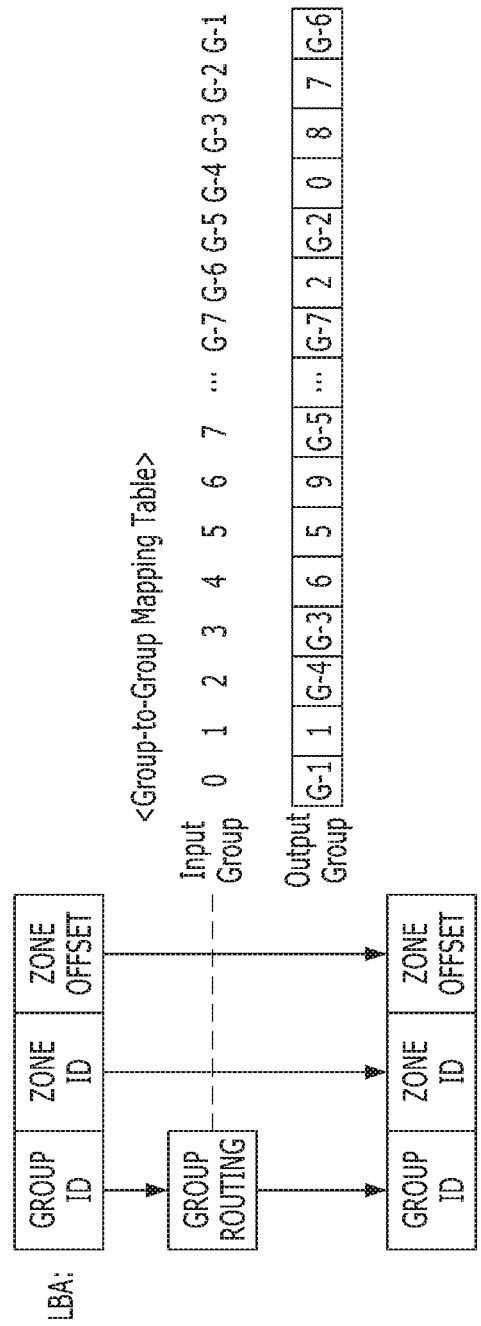
FIG. 12 illustrates an application example of a swap operation for selected LBA groups in accordance with an embodiment of the present invention.

FIG. 12 illustrates an application example of a swap operation for selected LBA groups in accordance with an embodiment of the present invention. This example may be applied to a zoned SSD, in which each zone may include multiple NAND blocks (e.g., 512 MB). When dealing with zoned SSDs, swap of groups may be implemented. For simplicity, it is assumed that a single zone corresponds to a single LBA group. In this case, swap of groups is swap of zones between FCPU cores. For a swap operation, a group routing scheme may be stored in a group-to-group mapping table as shown in FIG. 12. The group-to-group mapping table is used to remap an identifier (ID) of a group in a request from a host to a new value, which is later used to determine the FCPU core where the request shall be sent.

Figure 13:
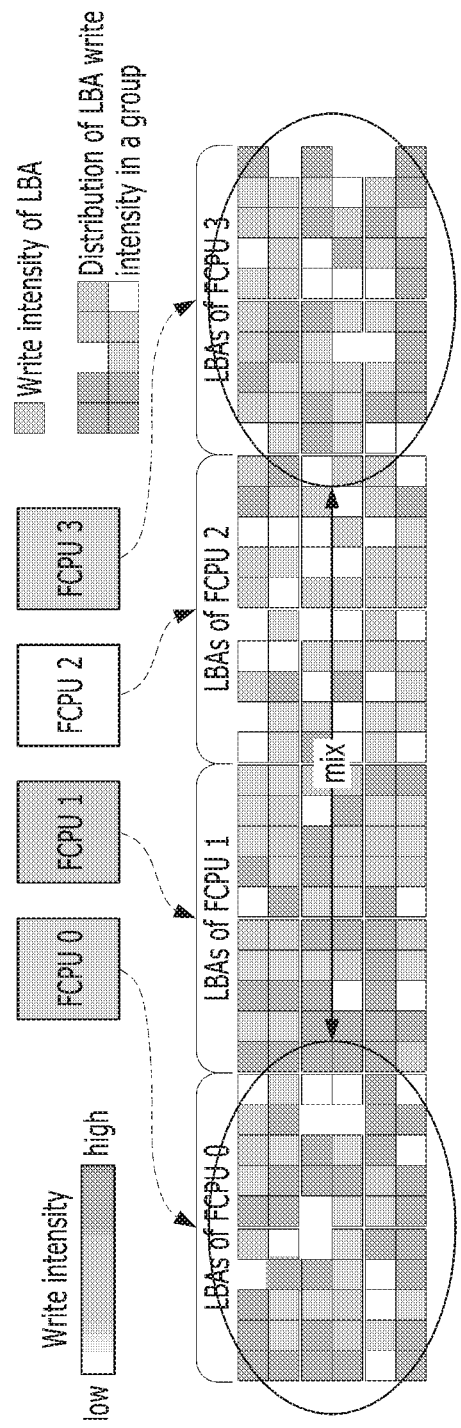
FIG. 13 illustrates an example of a mix operation for selected LBA groups in accordance with an embodiment of the present invention.

FIG. 13 illustrates an example of a mix operation for selected LBA groups in accordance with an embodiment of the present invention.

Referring to FIG. 13, the mix operation is performed between LBA groups of FCPU0 and LBA groups of FCPU3. In the illustrated example, the mix operation is performed between 6 LBA groups of FCPU0 and 6 LBA groups of FCPU3. However, any number of groups may be mixed, depending on the required performance.

In some embodiments, LBAs of groups for the mix operation may be selected from the entire LBA range (or a global LBA range), according to a set pattern. The pattern may specify which LBAs shall be chosen for each group. For example, the pattern may have forms: a bitmap for a certain LBA range; a pseudo-random sequence of core numbers (see FIG. 14); or a fixed pattern or method. The common rule for all patterns is that a single LBA may be selected only for one group, not for different groups. Once it is decided which groups are to participate in the mix operation, patterns are selected for these groups, from the LBAs in the respective groups to be mixed are identified. Corresponding LBAs are transferred to their new locations in NAND memory regions, so that routing according to patterns would be correct. Patterns may be selected so that write intensity distribution to LBAs remains equal and thus imbalance of write intensity is compensated. For example, a number of LBAs with large write intensity shall be transferred for cold core and a number of LBAs with low write intensity shall be transferred for hot core.

Figure 14:
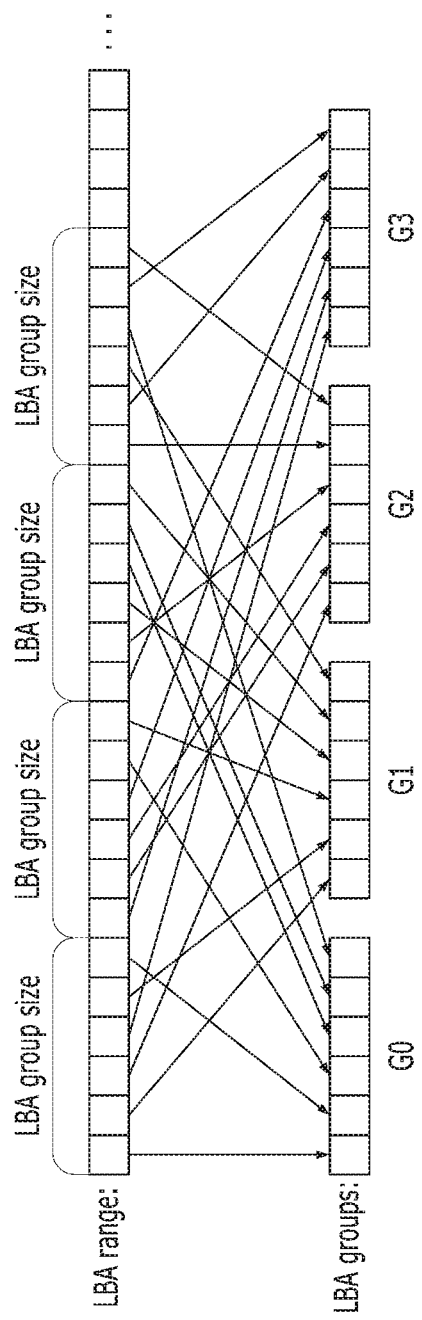
FIG. 14 illustrates an application example of a mix operation for selected LBA groups based on a set pattern in accordance with an embodiment of the present invention.

FIG. 14 illustrates an application example of a mix operation for selected LBA groups based on a set pattern in accordance with an embodiment of the present invention. This example may be applied to a normal SSD.

Referring to FIG. 14, it is assumed that there are four cores in the SSD. The whole LBA range is split into a number of equal parts of the size equal to an LBA group size. Then for every 4 parts, 4 groups for different cores are formed. Every LBA group is formed by selecting certain LBAs from these parts according to an LBA distribution pattern, i.e, a pseudo-random sequence of numbers, e.g, {0, 1, 2, 3, 1, 0, 3, 2, 2, 3, 0, 1, 3, 2, 1, 0, ... }. In the sequence, every number denotes an identifier (ID) of a FCPU core where LBA with the corresponding index shall be moved. For example, in the sequence above, "0" represents an FCPU #0, "1" represents an FCPU #1, "2" represents an FCPU #2 and "3" represents an FCPU #3. The IDs of groups are chosen according to the LBA index that is mapped. Therefore, in this example, if a sequence starts at LBA #0, then groups G01, G11, G12 and G13 are used. The LBA distribution pattern may be fixed. Alternatively, after a swap operation is performed, an LBA distribution pattern may be changed to another pattern, such as:
{3, 1, 2, 0, 3, 1, 2, 0, 3, 1, 2, 0, 3, 1, 2, 0, ... };
{1, 0, 2, 3, 1, 2, 0, 0, 2, 1, 3, 2, 0, 3, 1, ... }; or
{0, 1, 2, 3, 3, 2, 1, 0, 1, 0, 3, 2, 2, 3, 0, 1, ... }.

As described above, embodiments provide systems and methods for dynamically distributing logical block addresses between multicores in a memory system. Embodiments are capable of balancing workloads between the multicores.

Although the foregoing embodiments have been illustrated and described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive. The present invention is intended to embrace all modifications and alternatives that fall within the scope of the claims.

What is claimed is:

1. A data processing system comprising:
a host;
a plurality of memory devices configured to operate in parallel; and
a controller including a host interface controller and a plurality of cores, which are respectively coupled to the plurality of memory devices, and configured to:
split a logical block address (LBA) range associated with each of the plurality of cores respectively into a plurality of LBA groups associated with each respective core;
detect whether there is an imbalance of workloads among the plurality of cores;
when it is detected that there is the imbalance of workloads among the plurality of cores, identify a first core of the plurality of cores and a second core of the plurality of cores contributing to the imbalance of workloads, select a first LBA group of the plurality of LBA groups associated with the first core, and selecting a second LBA group of the plurality of LBA groups associated with the second core, wherein the controller in selecting the first LBA group and in selecting the second LBA group selects data for transfer between two LBA groups, the two LBA groups including the first LBA group and the second LBA group, based on determining a difference in write/erase utilizations between the two LBA groups is larger than a difference in write/erase utilizations between all other pairs of LBA groups of the plurality of LBA groups among the plurality of cores;
transfer the data selected for transfer between the two LBA groups from the first LBA group to the second LBA group and thereby reduce an imbalance between the first core and the second core; and reroute data initially intended for the first LBA group to the second LBA group.

2. The data processing system of claim 1, wherein the controller is further configured to:
monitor a respective write/erase utilization for each LBA group of the plurality of the LBA groups of among the plurality of cores by monitoring a write intensity for the respective LBA group in a set period; and
detect whether there is the imbalance of workloads among the plurality of cores based on the monitored write intensities of the plurality of LBA groups among the plurality of cores.

3. The data processing system of claim 1, wherein the controller is further configured to:
monitor a respective write/erase utilization for each LBA group of the plurality of the LBA groups among the plurality of cores by monitoring an erase count for the respective LBA group; and
detect whether there is the imbalance of workloads among the plurality of cores based on the monitored erase counts of the plurality of LBA groups among the plurality of cores.

4. The data processing system of claim 3, wherein the controller is further configured to;
determine which LBA in the first LBA group has a maximal erase count among LBAs in the first LBA group;
determine a difference between the maximal erase count of the determined LBA in the first LBA group and an overall average erase count of the first LBA group;
determine which LBA in the second LBA group has a maximal erase count among LBAs in the second LBA group; and
determine a difference between the maximal erase count of the determined LBA in the second LBA group and an overall average erase count of the second LBA group.

5. The data processing system of claim 2, wherein the controller is further configured to:
monitor the respective write intensity for each LBA group of the plurality of LBA groups among the plurality of cores by monitoring a number of writes for the respective LBA group; and
detect whether there is the imbalance of workloads between the plurality of cores based on the monitored numbers of writes of the plurality of the LBA groups among the plurality of cores.

6. The data processing system of claim 5, wherein the controller is further configured to determine an average number of writes of the plurality of LBA groups among the plurality of cores.

7. The data processing system of claim 2, wherein the controller is further configured to change all LBAs of the first LBA group to all LBAs of the second LBA group by swapping all of the LBAs of the first LBA group with all of the LBAs of the second LBA group.

8. The data processing system of claim 2, wherein the controller is further configured to swap at least one LBA of the first LBA group with at least one LBA of the second LBA group to mix remaining LBAs of the first LBA group with the at least one LBA of the second LBA group and mix the at least one LBA of the first LBA group with remaining LBAs of the second LBA group.

9. The data processing system of claim 2, wherein the controller is further configured to split the respective LBA range for each of the plurality of cores into the plurality of LBA groups associated with the respective core based on a set pattern.

10. The data processing system of claim 9, wherein the set pattern is indicated by a pseudo-random sequence.

11. A method for operating a data processing system, which includes a host, a plurality of memory devices configured to operate in parallel and a controller including a host interface controller and a plurality of cores, which are respectively coupled to the plurality of memory devices, the method comprising:
splitting a logical block address (LBA) range associated with each of the plurality of cores respectively into a plurality of LBA groups associated with each respective core;
detecting whether there is an imbalance of workloads among the plurality of cores;
in response to detecting that there is the imbalance of workloads among the plurality of cores, identifying a first core of the plurality of cores and a second core of the plurality of cores contributing to the imbalance of workloads and selecting a first LBA group of the plurality of LBA groups associated with the first core, and selecting a second LBA group of the plurality of LBA groups associated with the second core, wherein the selecting the first LBA group and the selecting the second LBA group include selecting data for transfer between two LBA groups, the two LBA groups including the first LBA group and the second LBA group, based on determining that a difference in write/erase utilizations between the two LBA groups is larger than a difference in write/erase utilizations between all other pairs of LBA groups of the plurality of LBA groups among the plurality of cores;
transferring the data selected for transfer between the two LBA groups from the first LBA group to the second LBA group and thereby reducing an imbalance between the first core and the second core; and
rerouting data initially intended for the first LBA group to the second LBA group.

12. The method of claim 11, wherein the detecting of whether there is an imbalance of workloads includes:
monitoring a respective write/erase utilization for each LBA group of the plurality of the LBA groups among the plurality of cores by monitoring a write intensity for the respective LBA group in a set period; and
detecting whether there is the imbalance of workloads among the plurality of cores based on the monitored write intensities of the plurality of LBA groups among the plurality of cores.

13. The method of claim 11, wherein the detecting of whether there is an imbalance of workloads includes:
monitoring a respective write/erase utilization for each LBA group of the plurality of the LBA groups among the plurality of cores by monitoring an erase count for the respective LBA group; and
detecting whether there is the imbalance of workloads among the plurality of cores based on the monitored erase counts of the plurality of LBA groups among the plurality of cores.

14. The method of claim 13, wherein the detecting of whether there is an imbalance of workloads includes:
determining which LBA in the first LBA group has a maximal erase count among LBAs in the first LBA group;
determining a difference between the maximal erase count of the determined LBA in the first LBA group and an overall average erase count of the first LBA group;

determining which LBA in the second LBA group has a maximal erase count among LBAs in the second LBA group; and determining a difference between the maximal erase count of the determined LBA in the second LBA group and an overall average erase count of the second LBA group.

15. The method of claim 12, wherein the detecting of whether there is an imbalance of workloads includes:

monitoring the respective write intensity for each LBA group of the plurality of LBA groups among the plurality of cores by monitoring a number of writes for the respective LBA group; and detecting whether there is the imbalance of workloads between the plurality of cores based on the monitored numbers of writes of the plurality of LBA groups among the plurality of cores.

16. The method of claim 15, wherein the detecting of whether there is an imbalance of workloads further includes determining an average number of writes of the plurality of LBA groups among the plurality of cores.

17. The method of claim 12, wherein the rerouting of data initially intended for the first LBA group to the second LBA group includes changing all LBAs of the first LBA group to all LBAs of the second LBA group by swapping all of the LBAs of the first LBA group with all of the LBAs of the second LBA group.

18. The method of claim 12, wherein the rerouting of data initially intended for the first LBA group to the second LBA group includes swapping at least one LBA of the first LBA group with at least one LBA of the second LBA group to mix remaining LBAs of the first LBA group with the at least one LBA of the second LBA group and to mix the at least one LBA of the first LBA group with remaining LBAs of the second LBA group.

19. The method of claim 12, wherein the splitting of the respective LBA range for each of the plurality of cores includes splitting the respective LBA range for each of the plurality of cores into the plurality of LBA groups associated with the respective core based on a set pattern.

20. The method of claim 19, wherein the set pattern is indicated by a pseudo-random sequence.

* * * * *